United States Patent [19]
Ushakov

[11] Patent Number: 5,597,013
[45] Date of Patent: Jan. 28, 1997

[54] ELECTROMAGNETIC CONTROL BALL VALVE

[75] Inventor: Arkady Ushakov, Cleveland, Ohio

[73] Assignee: Serge Vaks, Cleveland, Ohio

[21] Appl. No.: 541,951

[22] Filed: Oct. 10, 1995

[51] Int. Cl.⁶ ................................................. F16K 31/06
[52] U.S. Cl. ............................ 137/596.16; 251/129.14; 251/129.21
[58] Field of Search ........................ 251/129.14, 30.01, 251/30.05, 129.21; 137/625.64, 596.16

[56] References Cited

U.S. PATENT DOCUMENTS

| | | | |
|---|---|---|---|
| 4,531,707 | 7/1985 | Dotti et al. | 251/30.01 X |
| 4,782,860 | 11/1988 | Sakaguchi et al. | 251/129.14 X |
| 4,796,662 | 1/1989 | Hoffman et al. | 137/596.16 |

Primary Examiner—Kevin Lee

[57] ABSTRACT

A normally closed electrically controlled valve (10) that utilizes two opposing pressures to solely control the movable valve member or plunger (28). The plunger (28) has substantially different surface areas at its extreme ends (28A) and (28G). The opposing pressures enter through the left inlet port (21) and the right inlet port (51) that are at extreme ends of the valve (10). The plunger (28) controls flow between the left inlet (21), a radial port (24) and an exhaust port (32). The magnetic coil (42) is positioned in such a way that when energized it attracts the magnetically responsive, freely rotatable ball (50) from its original seat (A) in the closed position to its other seat (B) closing off the right inlet (51). Simultaneously, this causes a pressure drop in the fight major chamber (27B) and consequently the pressure force acting on the major plunger end (28G) dissipates. The pressure from the left inlet (21) now pushes the plunger (28) to its extreme fight position opening communication between the left inlet port (21) and the radial port (24). Communication between the radial port (24) and the exhaust port (32) is simultaneously closed. The valve (10) is now in the open position.

19 Claims, 3 Drawing Sheets

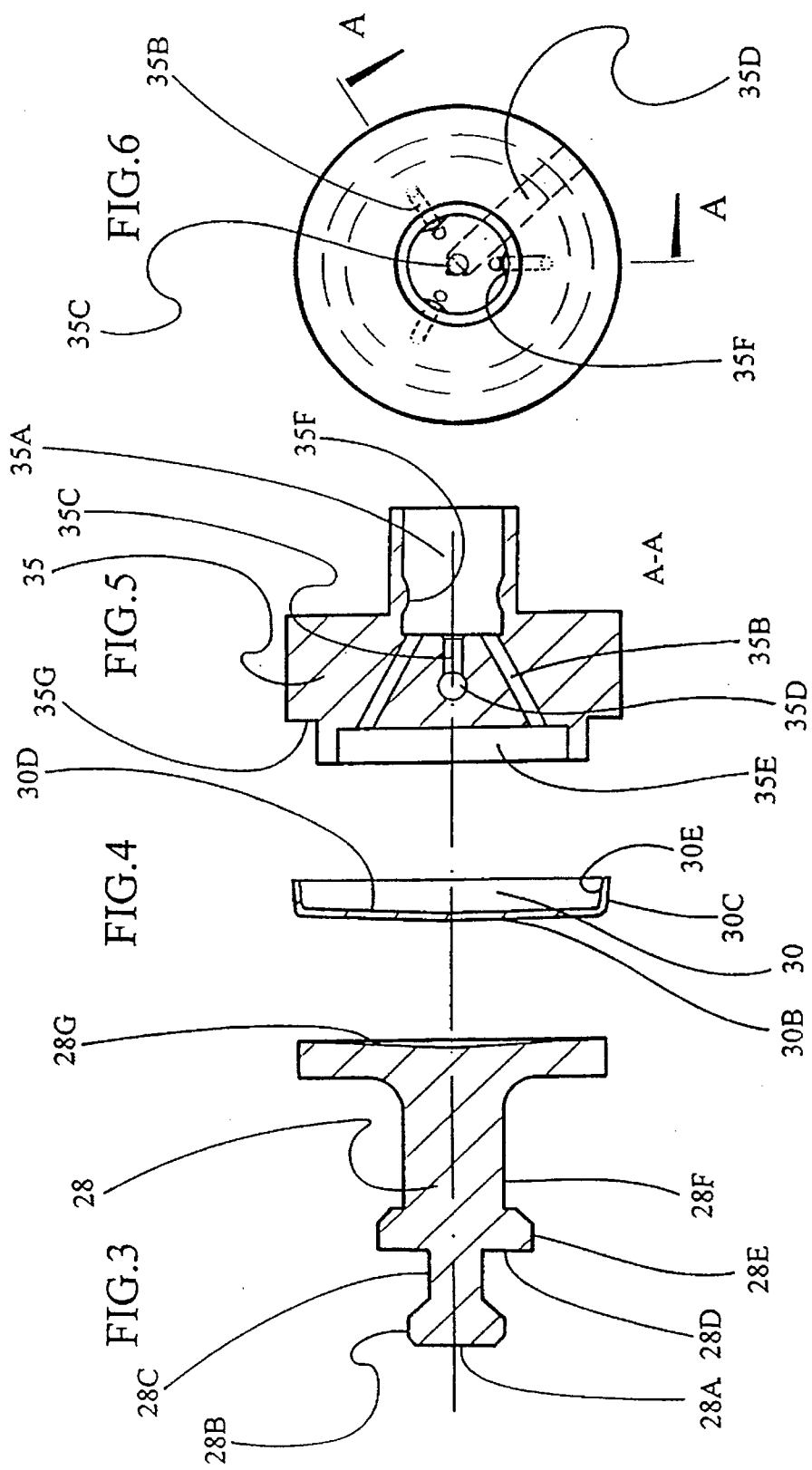

ELECTROMAGNETIC CONTROL BALL VALVE

BACKGROUND-FIELD OF INVENTION

This invention relates to an electromagnetic valve more particularly to a miniature pneumatic electromagnetic valve where optimal pressure, quick response and high flow is desired.

BACKGROUND-DESCRIPTION OF PRIOR ART

Heretofore electromagnetically operated valves have been restricted by the use of a spring in their design. These prior art valves have left much to be desired. Since none thus far have been able to hold relatively high pressures while simultaneously achieving a large flow rate within a miniature design.

The spring is usually used to bias a valve member into opening or closing a port. A substantial force is required to either contract or expand a spring that is powerful enough to hold at relatively high pressures. In order to create that force a large solenoid in the valve is required. Valves with relatively large solenoids and enough room to accommodate a spring lead to an inefficient miniature design. In addition, a large solenoid requires a higher wattage which is often undesirable. Also the use of springs tends to compromise the speed of responsiveness in a valve.

Also longevity of many prior art valves has been restricted by their sealing means, particularly that of O-rings. Whether stationary or not, the O-rings undergo friction during the operation of the valves. Either the external diameter undergoes wear from friction when the O-ring is in motion or the internal diameter wears out from the friction of a moveable valve member such as a plunger or spool. After continued use the wear of the O-ring renders it ineffective. This limits the life of the valve.

There have been creative inventions such as U.S. Pat. No. 3,921,670 to Clippard which utilizes a spring in the form of a spider. The spider design effectively minimizes the longitudinal space that a regularly shaped spring normally takes up. It also accomplishes longevity, a fast response time, and operates at low wattage. It does not however solve the main problem of achieving high pressures while having large flow rates in miniature valve designs. The force required to attract the armature that is positioned at the center of the spider has to overcome the natural bias of the spring. Unfortunately the natural bias of the spring cannot withstand high pressures in a miniature design. Although high pressures could be reached by reducing the diameter of controlling orifices, that is done at the expense of drastically reducing the flow rate, which greatly compromises the efficiency and utility of the valve. High pressures in valves without the benefit of large flow rates are usually useless.

OBJECTS AND ADVANTAGES

Accordingly several objects and advantages of this invention are that it has instantaneous responsiveness, longevity, operates at low wattage, and most importantly, holds much higher pressures than have been achieved with similar size prior art valves, while simultaneously having a very large flow rate.

This design utilizes equivalent opposing pressures to move the controlling valve member, a plunger, from side to side. There is no spring or for that matter any other device besides pressure, that controls the plungers movement. Since the plunger has substantially different diameters at its opposite ends, when pressure is applied to both ends of the plunger the major end with the greater surface area forces the plunger to one extreme. Unless an electric current is applied to the valve, the plunger remains at rest. The plunger controls flow between the left inlet port, the outlet port and the exhaust port. In the closed de-energized position of the valve, the left inlet is closed off by the minor end of the plunger with the aid of an O-ring as a seal. The O-ring is uniquely used not to experience any friction during its displacement and therefore doesn't restrict the longevity of the valve.

When the coil is energized, magnetic forces attract the magnetically responsive ball to the core, closing the right inlet. With the right inlet blocked one source of pressurized flow supply is now cut off. This causes an instantaneous pressure drop on the major end of the plunger. The pressure acting on the minor end of the plunger is now the sole force affecting the plunger. The pressure from the left inlet therefore pushes the plunger to the opposite extreme, thereby opening the valve. The left inlet and the outlet port are now in communication while the exhaust port is closed off.

At the heart of the valve is a distributor that is disposed between the plunger and the core; it directs incoming and outgoing flow and serves as a vital part in the efficiency of the current design. When the valve is in a closed, de-energized position, the distributor's through holes serve as supply lines. They supply pressurized flow to the major end of the plunger. When the valve is in an open, energized position, the same through holes serve as vent lines. They vent flow to the atmosphere. The dual function of the distributor aids in the efficiency of this valve.

Since the ball is freely rotatable and very lightweight the force required to attract it is minimal. Therefore a large solenoid is not required in the construction of this valve and consequently it functions at low wattage.

Due to the very short distance that the magnetically responsive ball travels, and the relative ease with which it is attracted to close off the right inlet, the valve also has an instantaneous responsiveness.

Most importantly, since no spring is required to aid the control valve member or plunger in its displacement, this contributes to a very efficient miniature design. Instead of a spring to contract or retract, this valve uses a lightweight ball to disrupt the pressurized supply and in turn affect the plungers displacement. Precisely because the force of opposing pressures does all the work, this miniature valve operates at very high pressures.

Further objects and advantages will become apparent from a consideration of the drawings and ensuing description.

DRAWING FIGURES

FIG. 3 is an enlarged plan view of the plunger.

FIG. 4 is an enlarged plan view of the frisbee.

FIG. 5 is an enlarged plan view of the distributor.

FIG. 6 is an enlarged section view of the distributor.

DESCRIPTION OF PREFERRED EMBODIMENT

Figure 1:
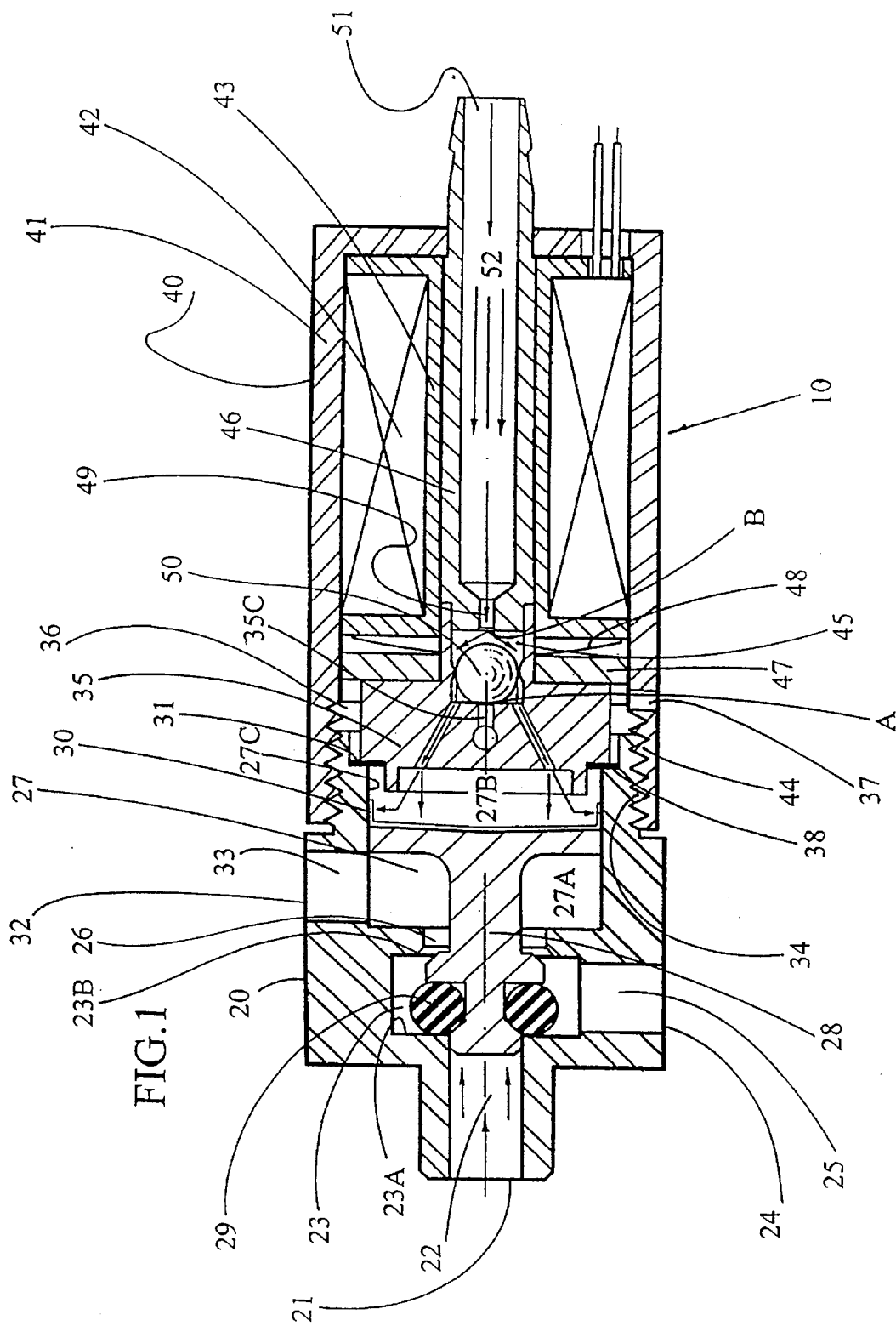
FIG. 1 is a cross-sectional view of a preferred form of valve in accordance with the invention, showing the valve in a normally closed, solenoid de-energized position with pressure supplied to both inlets.
Figure 2:
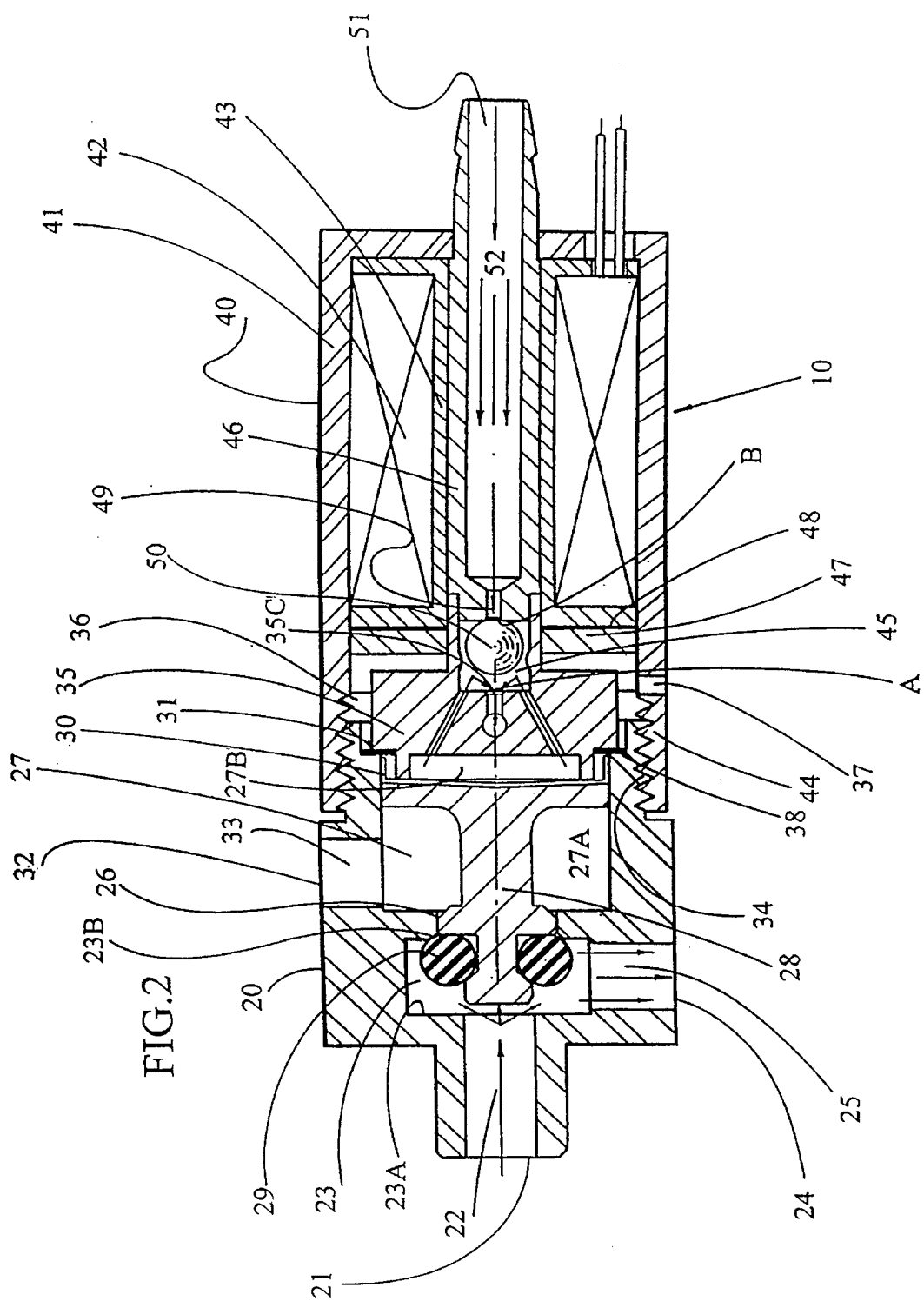
FIG. 2 is similar to FIG. 1 but showing the valve in the energized position.

The valve of the present invention is a normally closed three-way two-position valve assembly 10 which includes a rectangular valve body 20. Referring to FIG. 1 and FIG. 2 a left central inlet port 21 is disposed within body 20 and enters into minor chamber 23 by way of passage 22. A radial port 24 also enters minor chamber 23 via passage 25. Minor chamber 23 leads to a major chamber 27 by way of a passage or corridor 26. A radial exhaust port 32 enters major chamber 27 through passage 33.

Inside the valve body 20 is located a control valve member or plunger 28 with its extreme ends differing substantially in diameter. More precisely plunger 28 is disposed within chamber 23, corridor 26 and chamber 27 for axial displacement. The diameter of minor end 28A is just smaller than the diameter of passage 22 for slidability. Similarly the diameter of major end 28G is just smaller than the diameter of major chamber 27 for slidability. When the valve assembly 10 is in a closed position as in FIG. 1, the plunger 28 is in its furthest left position and a tip 28B protrudes into passage 22. A groove 28C acts as a seat for an O-ring 29 which forms a tight seal with a chamber wall 23A. When valve assembly 10 is in an open position the O-ring 29 forms a tight seal with chamber edge 23B as in FIG. 2. Inlet port 21 and port 24 are blocked off from each other when valve assembly 10 is in the normally closed de-energized position as in FIG. 1, while simultaneously port 24 is in communication with port 32. On the contrary, port 21 and port 24 are in communication when valve assembly 10 is in the energized position as in FIG. 2, while port 32 is blocked off from both ports 21,24.

Middle step 28E acts as a support for O-ring 29 and a face or stopper 28D reinforces O-ring 29 to prevent any leakage. Valve assembly 10 is designed especially so that O-ring 29 doesn't undergo any friction when it's displaced. As can be seen from FIG. 1 and FIG. 2, the external diameter of O-ring 29 is smaller than the internal diameter of minor chamber 23. The diameter of step 28E is just smaller than the diameter of corridor 26 and slidably fits through it when the valve assembly 10 opens and the plunger 28 travels to its furthest right position as in FIG. 2. The step 28E not only serves as a support for the O-ring 29 but also functions as a steady rest when the plunger 28 is in its furthest right position. A shaft 28F connects the step 28E and a major end 28G.

A specially designed seal or frisbee 30 sits on the major end 28G and although not joined to it, is in contact with it at all times. Major end 28G and frisbee 30 devide major chamber 27 into two smaller chambers; chamber 27B is to the right of major end 28G and frisbee 30, while chamber 27A is to the left. As can be seen from FIG. 4 a ftisbee external convex surface 30B blends into an external conical surface 30C, while an internal concave surface 30D blends into an internal conical surface 30E. Once assembled the external conical surface 30C takes on the form of wall 27C and acts as a leak proof seal between chambers 27B and chamber 27A. Surface 30B fits into an internal concave surface of major end 28G.

The chamber 27A is in constant communication with port 32. Chamber 27B is formed between the surfaces of the frisbee 30, the inner wall 27C, a distributor 35 and a seal 31.

Distributor 35 is disposed between the body 20 and a core 46. Distributor 35 has a cylindrically hollow portion 35A extending from the right as in FIG. 5. Along the same axis as portion 35A is a central vent hole 35C, which leads to a radial vent hole 35D that travels out of the distributor 35.

Spaced around central vent hole 35C are three equally spaced non-central through holes 35B. Holes 35B lead to a pocket 35E to the left of distributor 35. There are three teeth 35F that are also equally spaced around central hole 35C protruding out of the internal surface of portion 35A.

Right inlet port 51 at the far fight of valve assembly 10 enters passage 52. Passage 52 leads through orifice 49 past seat B into distributor chamber 45. In the normally closed de-energized position as in FIG. 1 pressure holds the freely rotatable ball 50 at rest in seat A, while ball 50 is blocking off vent hole 35C. Pressurized fluid in chamber 45 travels between teeth 35F, past the ball 50, through the non-central holes 35B, into pocket 35E thereby pressurizing major chamber 27B. Due to the significant difference in area between ends 28A and 28G, and the fact that equal pressure applied from both ends, end 28A and end 28G, is the sole force acting on the plunger 28, it is obvious plunger 28 will always be held in its left extreme.

The case 40 contains a number of magnetically responsive parts including a shell 41, a central core 46, a washer 47 and a ball 50. A washer 47 is located a little right of center of ball 50. A thin bent disc 48 is trapped between the washer 47 and bobbin 43. Disc 48 keeps washer 47 in its extreme left position.

When coil 42 that is wound on a bobbin 43 is energized, it starts a magnetic flux that travels along shell 41, washer 47, and core 46; all acting on the ball 50 and attracting it towards the core 46. The attractive forces displace the ball 50 from its seat A and pull it to the central core 46 causing it to rest in a new seat B closing orifice 49. Washer 47 is also displaced and moves to its extreme right position. The fact that washer 47 is a little right of center of ball 50, helps maximize the attractive forces. The ball 50 travels along chamber 45. Chamber 45 is just slightly larger in length than the ball 50. Once flow from inlet 51 is blocked off there occurs a pressure drop in chamber 27B since it is now in communication with the atmosphere. Flow travels from chamber 27B to a distributor chamber 45 via noncentralized holes 35B and then continues through axial hole 35C to radial hole 35D and enters cavity 36 from where it exits via radial vent hole 37 into the atmosphere. The pressure force on minor end 28A from inlet port 21 pushes the plunger 28 to the right as in FIG. 2, and permits inlet port 21 and port 24 to communicate. All this happens instantaneously. Port 24 is now an outlet and valve assembly 10 is open.

When the coil 42 is again de-energized the ball 50 is thrust into seat A, by the incoming pressure, and the teeth 35F orient the ball 50 along the central line of the distributor 35. Once in its seat A the ball 50 closes the hole 35C and cuts off communication with the atmosphere. While flow continues to travel between teeth 35F, through the non-centralized holes 35B and into chamber 27B. The pressure in chamber 27B equalizes with chamber 23 and due to the greater surface area of major end 28G pushes the plunger 28 to the left closing off flow from inlet port 21. Also the washer 47 is pushed back to its extreme left position by a bent disc 48 which is made of non-magnetic material. The valve 10 is now closed as in FIG. 1.

During assembly, body 20 and case 40 are joined together by threading an outer joining thread 34 of body 20 into an internally threaded extension 44 of case 40, until an internal shoulder 38 of body 20 sits on seal 31 and consequently on an internal shoulder 35G of the distributor 35. The distributor 35 and the central core 46 should form an air tight connection with the help of seal 31, from the connection chamber 45 comes into existence where the ball 50 is captured, in the cylindrically hollow portion 35A, between seat A and seat B.

CONCLUSION, RAMIFICATIONS AND SCOPE

As shown in the description the valve utilizes many unique concepts in the design and construction of electromagnetic valves. The use of opposing pressures to solely regulate the controlling member of the valve and the utilization of a freely rotatable, easily attractable ball to disrupt one of the pressures yields unprecedented benefits over the prior art.

The distributor is crucial in the efficiency of this design, serving a dual purpose. The non-central holes serve as supply lines when the solenoid is de-energized. However when the solenoid is energized the plunger is displaced to the right, forcing fluid from the major chamber through the same non-central holes that now serve as vents to the atmosphere. The distributor pocket needs to have a larger diameter than the minor end of the plunger plus a necessary length to insure instantaneous responsiveness. The teeth in the cylindrically hollow portion are also vital since they orient the ball along the central line. The accuracy of the teeth should be made with a minimal tolerance measured in the radial and linear direction.

The internal diameter of the chamber where the O-ring is disposed is bigger than the external diameter of the O-ring itself. The O-ring is thus displaced with out under going friction at its external and internal diameters. This erases the need for a high wall finish and in turn makes the construction of the valve simpler and less expensive. More importantly however it does not restrict the longevity of the valve.

The frisbee wall needs to be both elastic and at the same time thick enough to have longevity in order to compensate for friction with the chamber wall where it is displaced. The sealing affect of the frisbee is regulated by the amount of pressure applied to it. The higher the pressure the more force is exerted on the frisbee wall to seal off the right major chamber from the left major chamber, while no force at all is exerted on the frisbee wall when the plunger is displaced to the left. This function of the sealing affect of the frisbee reduces the friction that it undergoes during displacement. The frisbee is further made out of a PTFE which has a low coefficient of friction. Both the function of the sealing affect and the low coefficient of friction of the frisbee help extend the longevity of the valve.

The miniature embodiment that was used to describe this valve was chosen to exemplify the efficiency and general improvement over prior art electromagnetic valves. There is nothing to prevent enlarging all the dimensions since the features like maximum pressure and flow rate would consequently increase.

In a different embodiment the exhaust port could be disregarded. The valve would still function in an identical way except it would be a two way, two position valve.

In still a different embodiment this valve would operate with liquids. A liquid supply source hooked up to the left inlet, exerting roughly the same force on the minor diameter of the plunger as a gas supply source hooked up to the right inlet that exerts a force on the major diameter. The liquid would be separated from the gas by the frisbee. The valve would function in the same manner as the main embodiment.

The current valve is 1.670 inches in length. During operation at over 200 PSI this valve exhibited a flow rate more than five times that of analogous valves. The flow is adjustable by increasing or decreasing the diameter of the operating ports. The distance that the lightweight ball travels is less than 0.010 of an inch. This contributes to the fast response time and the low wattage required to operate the valve. The maximum operating pressure is also much higher than analogous prior art. Another important benefit is that the valve elements were designed with longevity in mind and undergoes very little friction during operation. Finally, the construction is fairly simple and therefore can be produced inexpensively.

Having now fully set forth both structure and operation of the preferred embodiment of the present invention, various other embodiments as well as certain various modifications of the embodiment herein shown will obviously occur to those skilled in the art upon becoming familiar with the underlying concept. Although the preferred embodiment shows the valve as a pneumatic, miniature, normally closed, three way valve, it should be understood that the invention may be practiced otherwise than as specifically set forth herein.

What is claimed is:

1. An improved electromagnetic valve comprising:

body structure presenting a plurality of chambers wherein a multi-stepped control valve member is disposed for axial displacement, said member has a minor end whose surface area is substantially less than the surface area of its extreme major end, opposing pressure is simultaneously supplied to both ends and is the sole force that controls the position and movement of said member, said member rests in one extreme when dual pressure is uninterrupted, an electric coil having a core magnetically responsive to energization of said coil, said core positioned to attract a magnetically responsive ball to draw it towards said core and effectively restrict a pressure supply passage, said passage supplies pressure to said major end of said member when not restricted by said ball, an axial inlet port and a radial port lead to a minor chamber wherein said minor end of said member undergoes displacement, when pressure is restricted from said passage, the pressure from said inlet port urges said member to the other extreme, permitting said inlet port to communicate with said radial port thereby opening the valve.

2. The valve of claim 1 wherein said member is a plunger, said plunger is disposed within a major chamber, a corridor and said minor chamber, said minor chamber is connected to said major chamber by said corridor.

3. The valve of claim 2 wherein said plunger has a middle step located on a shaft, said shaft runs from said middle step to said major end.

4. The valve of claim 3 wherein a radial exhaust port enters said major chamber, said exhaust port is in communication with said radial port when said plunger is in its extreme left position, while said exhaust port is blocked off when said plunger is in its other extreme.

5. The valve of claim 4 wherein said shaft has a groove between said minor end and said middle step, an O-ring sits on said groove and acts as seal, the outer diameter of said O-ring is less than the diameter of said minor chamber, so that no friction takes place during the displacement of said O-ring.

6. The valve of claim 5 wherein a frisbee disposed within said major chamber, said frisbee sits on the face of said major end, said frisbee seals off pressurized fluid from said passage and said exhaust port.

7. The valve of claim 2 wherein a distributor is firmly disposed between said body and said core, said distributor directs flow to and from said major chamber.

8. The valve of claim 7 wherein said distributor contains a central vent hole, said vent hole leads to a radial vent hole, said radial vent hole leads out of said distributor and out into the atmosphere, a plurality of non-central holes are positioned around said central vent hole and lead through said distributor into said major chamber.

9. The valve of claim 8 wherein a cylindrically hollow portion extends from said distributor, said ball is captured inside said portion, a plurality of teeth extending from the internal surface of said portion encircle said vent hole, when said coil is de-energized said teeth orient said ball, to effectively restrict said vent hole.

10. The valve of claim 9 wherein a pocket is located on the opposite side of said portion, said pocket has a larger diameter than said minor end, said pocket is of necessary length so as to insure fast response.

11. The valve of claim 10 wherein a magnetically responsive washer is disposed around said portion, said washer is displaceable and aids in the attraction of said ball.

12. An improved electromagnetic valve comprising:

a body and a casing that are engaged by mounting means, a control valve member disposed within said body, said member has a minor end of substantially smaller surface area than a major end, opposing fluid pressure is supplied to said minor end and said major end, the opposing pressure is the sole force that controls the movement of said member, an axial inlet port and an other port enter a minor chamber wherein said minor end undergoes displacement, said inlet port supplies pressurized fluid to said minor end, a core is located in said casing, said core contains a passage, said passage supplies pressurized fluid to said major end of said member, an electrical coil is disposed between said core and said casing, a distributor disposed between said body and said core, said distributor contains an axial vent hole, said axial vent hole leads to a non-axial vent hole out of said distributor, said distributor also contains one or more non-central holes spaced around or adjacent to said axial vent hole, and leading through said distributor into a major chamber, a distributor chamber is formed inside said distributor with a tip of said core, wherein a magnetically responsive ball is captured, when said coil is de-energized pressure from said passage forces said ball against said axial vent hole, effectively closing said axial vent hole, while flow travels through said non-centralized hole or holes into said major chamber and acts upon said major end, forcing said member to one extreme, as a result communication between said inlet port and said other port is blocked off, when said coil is energized said core acts magnetically on said ball drawing it towards said tip of said core, restricting flow from said passage, simultaneously pressure on said major end of said member diminishes via said non-centralized hole or holes into said distributor chamber and out through said non-axial vent hole via said axial vent hole, at the same time pressure acting on said minor end pushes said member to the other extreme, permitting communication between said inlet port and said other port, the valve is now open.

13. The valve of claim 12 wherein a frisbee sits on a face of said major end of said member, a wall of said frisbee forms a tight seal with a surface of said major chamber, said frisbee has an external convex face that blends into an external conical wall of said frisbee, an internal concave face of said frisbee blends into an internal conical wall.

14. The valve of claim 12 wherein said member is a plunger and has a middle step located between said minor end and said major end.

15. The valve of claim 14 wherein a groove is located between said middle step and said minor end, an O-ring sits in said groove, a diameter of said minor chamber is larger than that of an external diameter of said O-ring, therefore said O-ring does not undergo any friction as said plunger is displaced.

16. The valve of claim 12 wherein said distributor directs flow between said distributor chamber wherein said ball is captured and said major chamber.

17. The valve of claim 16 wherein said distributor has a hollow cylindrical portion, said non-central through hole or holes and said axial vent hole lead inside said hollow portion of said distributor, said axial vent hole is on a central axis.

18. The valve of claim 17 wherein a plurality of teeth, located on a surface of said hollow cylindrical portion and around said axial vent hole orient said ball to close said axial vent hole when the valve is de-energized.

19. The valve of claim 12 wherein said distributor has a pocket extending from the opposite side of said hollow cylindrical portion, said non-central holes of said distributor lead to and from said pocket, said pocket is part of said major chamber.

* * * * *